Oct. 28, 1958
B. B. OHNSTAD
2,858,000
UNIVERSAL CONVEYOR ROLLER
Filed Feb. 20, 1956
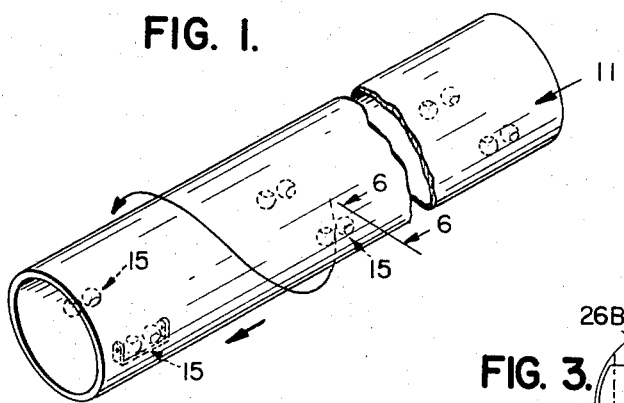
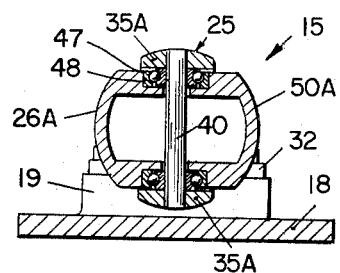
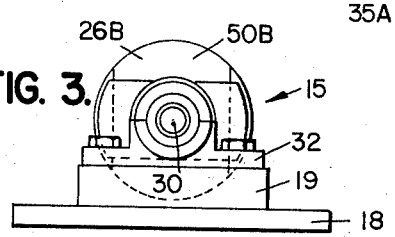
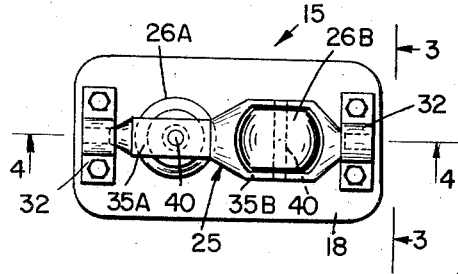
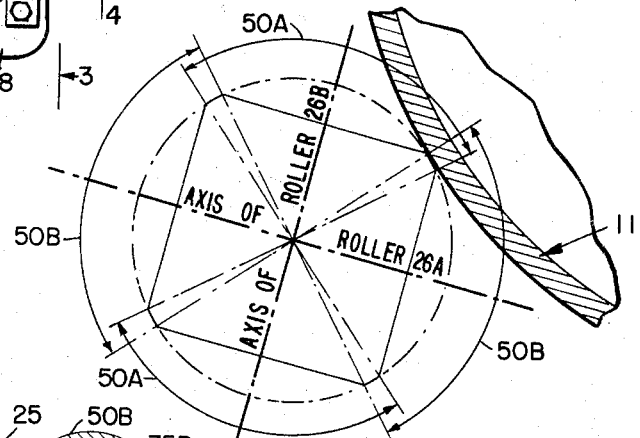
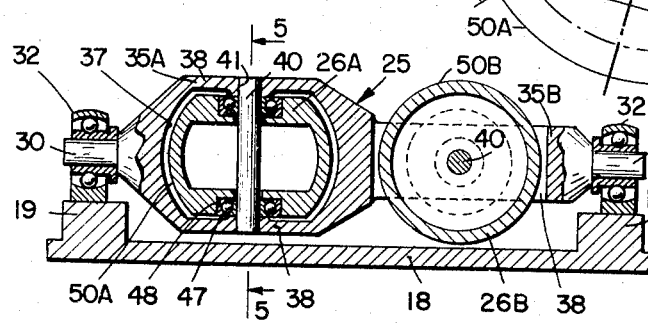
INVENTOR
BURL B. OHNSTAD
BY
*Mason & Graham*
ATTORNEYS

United States Patent Office 2,858,000
Patented Oct. 28, 1958

2,858,000
UNIVERSAL CONVEYOR ROLLER

Burl B. Ohnstad, South Gate, Calif., assignor to American Pipe and Construction Co., Los Angeles, Calif., a corporation of Delaware Application February 20, 1956, Serial No. 566,497

8 Claims. (Cl. 193—35)

This invention has to do with means for supporting cylindrical objects for movement both axially and rotatively with a minimum amount of friction.

There are numerous instances where it is necessary to provide anti-friction means for supporting a rotating cylindrical body for movement axially of itself, as, for example, in the making of helical seam tubing where the completed product issues from the fabricating machine longitudinally of itself and with a rotative motion. While I am aware that conventional and ball-type casters have been used for this purpose, neither has proved completely satisfactory. Conventional casters are inherently unable properly to track or follow such a moving object with its compound motion without excess slippage. On the other hand, roller casters can only be used vertically without damage and even then are unsatisfactory, because they become damaged by dirt.

It therefore is an object of my invention to provide a novel and improved roller construction particularly suitable for use in supporting a cylindrical object for movement axially of itself wherein the object may also be rotating which does not have the disadvantages of casters and other known means of support.

A further object is to provide an improved roller means for the purpose above described which can be mounted in various positions without affecting its efficiency.

A further object is to provide a roller or anti-friction support means which permits free movement of the supported object in any direction relative to the support means.

Another object is to provide a novel universal roller means which is so constructed that sealed bearings may be incorporated therein.

These and other objects will be apparent from the drawing and the following description. Referring to the drawing:

Fig. 1 is a diagrammatic view of a tubular member showing the dual roller means of the invention located therealong for supporting the member;

Fig. 2 is a plan view of a dual roller unit embodying the invention;

Fig. 3 is an end elevational view on line 3—3 of Fig. 2;

Fig. 4 is an enlarged sectional view on line 4—4 of Fig. 2;

Fig. 5 is a cross-sectional view on line 5—5 of Fig. 4; and

Fig. 6 is a diagrammatic view illustrating the effective peripheral surface of 360 degrees provided by the two rollers as against a tubular member to be supported, the view being taken in the direction indicated by line 6—6 of Fig. 1.

More particularly describing the invention, Fig. 1 represents a typical installation showing how a cylindrical member, designated 11, would be supported by a plurality of my dual roller units, designated generally 15, for movement of the member both axially and rotatively. No attempt has been made in Fig. 1 to show a framework as would be required for supporting the roller units themselves, since such a framework may take any desired form.

Referring now to Figs. 2–4, inclusive, the dual roller unit 15 is shown as comprising a plate-like base 18 which is formed to provide a pair of pillow blocks 19, one adjacent each end of the base.

The roller assembly unit comprises a roller housing 25 which is mounted for rotation and which carries two rollers, designated 26A and 26B, respectively. The roller housing is shown as having journal portion 30 at its ends which are supported for rotation in bearings 32 mounted on the blocks 19, respectively. The housing is formed to provide a pair of roller-receiving or roller-mounting sections, designated individually 35A and 35B. Each of these sections defines a roller-receiving opening 37, the openings being disposed at right angles to each other and at right angles to the axis of rotation of the housing. Each housing section is substantially a double-ended yoke having parallel, laterally spaced side walls 38. The latter are relatively narrow as compared to the diameter of the rollers and have a laterally arcuate, convex surface. The diameter of the rollers is greater than the greatest width of the housing sections so that each roller extends farther laterally of the axis of rotation than the side walls of the roller mounting section for the other roller. A pin 40 is mounted with its ends in aligned bores 41 in the walls 38, being secured in any conventional manner. The rollers are rotatably mounted on the pins and for this purpose are provided with bearings 47 in counterbores 48 at the sides.

The rollers may be of hollow construction as shown, but this is not essential. Each roller has a laterally arcuate, circular peripheral surface. This is designated 50A on roller 26A and 50B on roller 26B. The peripheral surfaces 50A and 50B are, in each case, curved laterally to be concentric about the center of the roller. Thus each roller is in the form of a sphere, truncated at opposite sides.

As previously noted, the diameter of each roller is greater than the greatest width of the housing. This, in conjunction with the fact that the width of the periphery of each roller exceeds 90°, results in the provision by the two rollers of 360° of supporting surface around the axis of rotation of the housing for an object to be supported. Actually the total width of the bearing area or support exceeds 360° as is apparent from Fig. 6. Referring to that figure, the width or lateral extent of each roller is shown with reference to a circle; graphically illustrating the overlap. Thus, while the rollers are spaced, their surfaces 50A and 50B nevertheless provide full 360° support around the axis of rotation of the housing for an article, such as tube 11, to be supported. Thus, assuming the roller housing to be mounted with its axis of rotation parallel to the axis of the tube to be supported, the rollers always provide a surface to support the tube irrespective of the position of the roller housing.

Although I have shown and described a preferred form of my invention, I contemplate that various changes and modifications may be made without departing from the scope of the invention. By way of example, a greater number of rollers may be used, reducing the width of the individual rollers.

I claim:

1. A universal dual roller device comprising a support, a roller housing member journaled on said support for rotation, and a pair of rollers carried by said housing member, said rollers being mounted for rotation about relatively fixed axes normal to each other and normal to the axis of rotation of said housing member, the axes of said rollers intersecting the axis of rotation of said housing member, the periphery of each roller projecting laterally beyond said housing on each side thereof.

2. A device as set forth in claim 1 in which the peripheral surface of each roller is concentric about the center of the roller throughout its width.

3. A universal dual roller device comprising a support, a roller housing journaled on said support for rotation, said housing being formed to provide a pair of roller-receiving openings, said openings being spaced axially of the axis of rotation of the housing and extending normal thereto laterally through the housing from side to side, said openings extending generally at right angles to each other, and a roller in each opening rotatably carried by the housing, the axes of rotation of the rollers being normal to each other and to the axis of rotation of said housing.

4. A device as set forth in claim 3 in which said roller housing is journaled at its ends.

5. A device as set forth in claim 3 in which each roller is in the form of a sphere truncated at opposite sides and having a width across the surface of its periphery of at least about 90°.

6. A universal dual roller device comprising a support, a roller housing journaled on said support for rotation, and a pair of rollers carried by said housing for rotation upon individual axes normal to and intersecting the axis of rotation of said housing, said rollers each projecting laterally beyond the housing on each side thereof and collectively providing 360° of peripheral supporting surface around the axis of rotation of said housing.

7. A universal dual roller device comprising a support, a roller housing journaled on said support for rotation, and a plurality of rollers carried by said housing for rotation upon individual axes normal to the axis of rotation of said housing, said rollers collectively providing 360° of peripheral supporting surface around the axis of rotation of said housing, each of said rollers extending through said housing and projecting beyond the housing on each side thereof.

8. A universal dual roller device comprising a support, a roller housing rotatably journaled on said support, and a pair of rollers carried by said housing, said rollers being mounted for rotation about relatively fixed axes disposed normal to each other and normal to the and intersecting axis of rotation of said housing, each said roller having a circular peripheral surface extending 360° around the axis of rotation of the roller, said surface extending laterally through slightly more than 90° and being concentric with respect with the center of the roller.

References Cited in the file of this patent

UNITED STATES PATENTS

| 2,667,978 | Pridy | Feb. 2, 1954 |

FOREIGN PATENTS

| 502,510 | Germany | July 16, 1930 |